(12) United States Patent
Dion et al.

(10) Patent No.: US 7,373,857 B2
(45) Date of Patent: May 20, 2008

(54) COMPOSITE METAL ARTICLE AND METHOD OF MAKING

(75) Inventors: Paul Armand Dion, North Attleboro, MA (US); Gregg Anthony Dion, North Attleboro, MA (US)

(73) Assignee: William Engineering LLC, Seekonk, MA (US)

( * ) Notice: Subject to any disclaimer, the term of this patent is extended or adjusted under 35 U.S.C. 154(b) by 55 days.

(21) Appl. No.: 10/207,409

(22) Filed: Jul. 29, 2002

(65) Prior Publication Data

US 2004/0016132 A1 Jan. 29, 2004

(51) Int. Cl.
*B23D 6321/00* (2006.01)

(52) U.S. Cl. ............... 76/112; 76/101.1; 228/165; 219/118

(58) Field of Classification Search ........... 30/350; 76/112, 101.1, 104.1; 148/600, 524, 621; 428/685; 164/98, 461, 91; 228/136, 170, 228/171, 180.5, 165, 166, 120, 144, 186; 219/118

See application file for complete search history.

(56) References Cited

U.S. PATENT DOCUMENTS

| | | | |
|---|---|---|---|
| 1,434,047 A | 10/1922 | Debats | |
| 2,226,944 A | 12/1940 | Reeve | |
| 2,686,439 A | 8/1954 | Tobert | |
| 2,706,328 A * | 4/1955 | Karmazin | 228/144 |
| 2,941,282 A | 6/1960 | Fromson | |
| 2,961,762 A * | 11/1960 | Clark et al. | 228/170 |
| 3,034,379 A | 5/1962 | Bernstein et al. | |
| RE25,434 E | 8/1963 | Christensen | |
| 3,162,187 A | 12/1964 | Christensen | |
| 3,315,548 A | 4/1967 | Anderson et al. | |
| 3,371,393 A | 3/1968 | Grassman | |
| 3,468,015 A | 9/1969 | Santala | |
| 3,593,600 A * | 7/1971 | Adams et al. | 76/112 |
| 3,616,982 A | 11/1971 | Dion | |
| 3,702,497 A | 11/1972 | Dion | |
| 3,707,617 A | 12/1972 | Rutter et al. | |
| 3,714,701 A | 2/1973 | Dion et al. | |
| 3,762,007 A | 10/1973 | Dion et al. | |
| 3,894,675 A * | 7/1975 | Klebl et al. | 228/130 |

(Continued)

FOREIGN PATENT DOCUMENTS

DE 27 38 601 * 2/1976

(Continued)

OTHER PUBLICATIONS

European Search Report, PCT/US0321320, mailed on Jan. 11, 2007, 7 p.

*Primary Examiner*—Hwei-Siu C. Payer
(74) *Attorney, Agent, or Firm*—Wilmer Cutler Pickering Hale and Dorr LLP

(57) ABSTRACT

A composite metal article from two dissimilar metals is prepared. A metal base is comprised of a first metal and having first and second opposing surfaces and a least one longitudinally-positioned depression in each of the first and second opposing surfaces for receiving a wire. An elongated metal element comprised of a second metal is introduced into each of the at least one first and second depressions of the metal base to form a composite assembly, and the composite assembly is heated under pressure to urge the adjacent surfaces of the second metal elements and the depressions together to form a bonded article.

40 Claims, 14 Drawing Sheets

U.S. PATENT DOCUMENTS

| | | | |
|---|---|---|---|
| 3,930,426 A | 1/1976 | Berggren et al. | |
| 4,068,976 A | 1/1978 | Friedline | |
| 4,125,936 A | 11/1978 | Rozmus | |
| 4,187,754 A | 2/1980 | Beaty | |
| 4,232,096 A | 11/1980 | Franzen et al. | |
| 4,409,296 A | 10/1983 | Ward | |
| 4,461,268 A | 7/1984 | Inoue et al. | |
| 4,463,645 A | 8/1984 | Goellner | |
| 4,484,959 A | 11/1984 | Boucher et al. | |
| 4,505,251 A | 3/1985 | Stoll | |
| 4,557,172 A | 12/1985 | Yoneda | |
| 4,599,771 A | 7/1986 | Trenkler et al. | |
| 4,722,125 A * | 2/1988 | Peng | 29/522.1 |
| 4,722,320 A | 2/1988 | Delk, III | |
| 4,727,788 A | 3/1988 | Yoshida et al. | |
| 4,798,932 A | 1/1989 | Dion et al. | |
| 4,813,324 A | 3/1989 | Yoshida et al. | |
| 4,827,822 A | 5/1989 | Yoshida et al. | |
| 4,883,500 A | 11/1989 | Deakins et al. | |
| 4,958,546 A | 9/1990 | Yoshida et al. | |
| 5,042,711 A | 8/1991 | Iskenderian et al. | |
| 5,091,264 A | 2/1992 | Daxelmueller et al. | |
| 5,094,135 A | 3/1992 | Nakahara et al. | |
| 5,246,160 A * | 9/1993 | Jonas | 228/186 |
| 5,417,777 A | 5/1995 | Henderer | |
| 5,429,016 A | 7/1995 | Rowlett | |
| 5,615,727 A | 4/1997 | Ollman | |
| 5,752,563 A | 5/1998 | Ollman | |
| 5,855,157 A | 1/1999 | Okamura et al. | |
| 5,863,358 A | 1/1999 | Krzysztalowicz | |
| 5,901,630 A | 5/1999 | Kataoka et al. | |
| 6,001,777 A * | 12/1999 | DeMoranville et al. | 505/430 |
| 6,058,923 A | 5/2000 | Arntz et al. | |
| 6,158,324 A | 12/2000 | Kullmann et al. | |
| 6,220,139 B1 | 4/2001 | Kobayashi et al. | |
| 6,244,152 B1 | 6/2001 | Di Nicolantonio | |
| 6,293,020 B1 | 9/2001 | Julien | |
| 6,298,762 B1 | 10/2001 | LaRue et al. | |
| 6,439,094 B1 | 8/2002 | Yoneda et al. | |
| 6,532,852 B1 | 3/2003 | Tsujimoto et al. | |
| 6,598,509 B2 | 7/2003 | Cook et al. | |
| 7,017,465 B2 | 3/2006 | Dion et al. | |
| 7,096,704 B2 * | 8/2006 | Asano | 72/205 |
| 2002/0148340 A1 | 10/2002 | Tsujimoto | |
| 2002/0184981 A1 | 12/2002 | Tsujimoto | |

FOREIGN PATENT DOCUMENTS

| | | | |
|---|---|---|---|
| EP | 0 365 843 | * | 5/1990 |
| JP | 62157720 | | 7/1987 |
| JP | 3-108216 | * | 5/1991 |
| JP | 10309701 A | * | 11/1998 |
| SU | 307877 | * | 10/1971 |
| SU | 474420 | * | 9/1975 |

* cited by examiner

COMPOSITE METAL ARTICLE AND METHOD OF MAKING

BACKGROUND OF THE INVENTION

1. Field of the Invention

This invention relates to metal articles made from dissimilar metals. It also relates to improved methods of making saw blades, and in particular, composite saw blades.

2. Description of Related Art

Saw bands and saw blades must have high dimensional stability of their cutting edges as well as high wear resistance. They should also be able to withstand the high loading produced by compressive, flexural and shearing forces, even under the temperatures that result from the friction between the saw blade and the material being sawn. Since it is difficult to combine the properties mentioned above in a single material, saw blade nowadays usually comprise a relatively tough metal base with high bending fatigue strength and a cutting-edge band of a high-speed steel that is less tough but highly wear resistant. The cutting-edge band is of such a width that at least the teeth tips of the saw band or blade, or even the cutting teeth as a whole, can be cut out from it.

Composite saw blades, that is, saw blades made up of two or more dissimilar materials, have been prepared by welding a thin strip of cutting tool steel to an edge of a flexible alloy steel backer. A common welding technique is electron beam welding; however, the resulting weld, an alloy of the two metals and a heat-affected area adjacent to it, is materially weakened. In preparation for welding, and in particular for electron beam welding, the metal backer and the thin strip of cutting tool steel are rolled and annealed repeatedly to attain the desired dimensions for welding. When welding dimensions are achieved, both the metal backer and the strip still needs to be further conditioned to obtain sharp, square edges at the site of welding. This process can be very time consuming and costly.

Composite metal articles also have been prepared by casting molten cutting tool steel against a supporting metal strip. The molten cutting tool steel is fed into a space adjacent to the supporting metal strip, where it bonds.

Solid phase edge bonding has been used for side-by-side joining of metal strips by application of heat and pressure under a reducing atmosphere. Solid phase bonding is accomplished by heating the metal strips under sufficient pressure to form a metallurgical bond. Although solid state bonding can produce a metallurgical bond without deleterious effect to neighboring metal area, solid state edge bonding does not generate sufficient new bonding surfaces, heat and pressure to form a strong bond, and the joined strips often do not survive subsequent processing.

Hot rolling of metals is known, and the hot rolling of steel ingots has been in common practice for many years. Hot rolling is usually carried out at temperatures around 2000° F., and the hot rolled steel typically is cold-rolled to its final dimensions. It is often necessary when rolling high speed steel to anneal the steel after each 10% to 30% cold worked reduction due to damage, i.e., work hardening, resulting from cold working. Thus, cold working requires additional time-consuming and costly processing steps.

Hot bonding has been used to prepare composite metal articles such as copper clad steel by heating a steel core and two copper strips to hot rolling temperatures using electric resistance heating. The three components are introduced into a chamber with a reducing atmosphere and are then passed directly into a roll, where pressure and heat bond the materials. As with hot rolling, it is most often necessary to cold work the article to its final dimensions.

Thus, improved methods for providing composite articles having high bond strength between different metals are desired.

There remains a need for efficient manufacture of composite metal articles.

There remains a further need for composite metal articles having a strong bond between the component metals with minimal material damage to the bonding region.

These and other limitations of the prior art are addressed in the following invention.

SUMMARY OF THE INVENTION

The present invention provides a composite metal article that exhibits superior bonding between the dissimilar metals. The composite article is capable of being further processed into saw blades or other useful articles. A saw blade with superior cutting and wear-resistant properties is provided.

The present invention also provides a simple and effective method for forming a composite metal article. According to one aspect of the invention, a method of making a composite metal article from two dissimilar metals includes providing a metal base comprised of a first metal and having first and second opposing surfaces, said base having a least one longitudinally-positioned depression in at least one of said first and second opposing surfaces for receiving a wire; introducing an elongated metal element comprised of a second metal into said at least one first and second depressions of the metal base to form a composite assembly; and heating the composite assembly under pressure to urge the adjacent surfaces of the second metal elements and the depressions together to form a bonded article.

In one or more embodiments, the metal base is a sheet or strip. A sheet or strip has its conventional meaning and includes one dimension, e.g., thickness, that is significantly smaller than the other two dimensions, e.g., length and width. Exemplary dimensions include an aspect ratio (width: thickness) of greater than about 5.

In one or more embodiments, the metal base is a metal bar. Metal bar has its conventional meaning and includes one dimension, e.g., thickness, that is smaller than the other two dimensions, e.g., length and width; however, the aspect ratio (width:thickness) is not as great, e.g., 1:1 to about 4:1.

As used herein "transverse direction" is considered to be the direction perpendicular to the plane of the base, or in the direction of the applied pressure. The transverse direction typically is across the thickness of the article.

In one aspect of the invention, a method of making a composite metal article from two dissimilar metals includes providing a metal base comprised of a first metal and having first and second opposing surfaces, said base having at least one longitudinal depression in at least one of said first and second opposing surfaces for receiving a wire; introducing a wire comprised of a second metal into said at least one depression of the metal base to form a composite assembly; and heating the composite assembly under pressure to urge the adjacent surfaces of the second metal elements and the depressions together to form a bonded article.

In another aspect of the invention, a method of making a composite metal article from two dissimilar metals includes providing a metal base comprised of a first metal and having first and second opposing surfaces, positioning at least one wire comprised of a second metal at a location on at least one of said first and second surfaces; restricting the lateral movement of the wire relative to its location on said surface to form a composite assembly; and heating the composite assembly under pressure to urge the adjacent surfaces of the at least one wire and the metal together to form a bonded article.

In still another aspect of the invention, a method of making a composite wire includes providing a metal bar comprised of a first metal and having first and second opposing surfaces, said base having a least one longitudinal depression in at least one of said first and second opposing surfaces for receiving a wire; introducing a wire comprised of a second metal into said at least one depression of the metal base to form a composite assembly; and heating the composite assembly under pressure to urge the adjacent surfaces of the second metal elements and the depressions together to form a bonded article.

In another aspect of the invention, a composite metal article includes a base comprised of a first metal and having first and second opposing surfaces; and at least one elongated member comprised of a second metal, said at least one elongated member embedded in at least one of said first and second opposing surfaces and positioned along the length of the base, wherein the surface of the base containing the embedded elongated member and the opposing surface form planar surfaces, and wherein the base and the embedded, elongated member form a metallurgical bond along their interface.

In another aspect of the invention, a composite metal cutting tool includes a base comprised of a first metal and having a first thickness at a first edge and having a tapered region on the opposing edge of the base that tapers from said first thickness to a second, smaller thickness; and at least one edge member located adjacent to the tapered edge region of the base, the edge member comprised of a second metal and forming a metallurgical bond with a surface of the tapered region of the meal base, such that the thickness of the edge member and the tapered region of the metal base is the same as the first thickness of the metal base.

In still another aspect of the invention, a turks' head having improved restraint on lateral spread includes a first pair of horizontal rolls; and a second pair of vertical rolls located at the edges of the horizontal rolls, wherein the rotational axis of the vertical rolls is offset upstream of the rotational axis of the horizontal rolls, said offset being within the arc of contact of the horizontal roll with a material to be processed.

In yet another aspect of the invention, an apparatus of making a composite metal article includes:

means for introducing a metal base into a first controlled atmosphere;

means for introducing first and second elements into a first controlled atmosphere and for positioning the first and second elements adjacent to the metal base at a location where bonding is to occur;

means for heating the metal base and first and second wires;

at least one roll pair for applying pressure to the metal base and two wires; and means for monitoring and controlling tension.

As used here and throughout the specification, the term "about" refers to ±10% of the stated value.

BRIEF DESCRIPTION OF THE DRAWING

Various objects, features, and advantages of the present invention can be more fully appreciated with reference to the following detailed description of the invention when considered in connection with the following figures, in which like reference numerals identify like elements. The following drawings are for the purpose of illustration only and are not intended to be limiting of the invention, the scope of which is set forth in the claims that follow.

DETAILED DESCRIPTION OF THE INVENTION

The present invention provides a composite metal article that exhibits superior bonding between the dissimilar metals. The composite metal article is formed between at least two dissimilar metals. As used herein, it is understood that the term "metals" includes metal alloys. The composite metal article is comprised of a metal base and one or more other metal elements that form a strong bond with the metal base. The bond is formed without deleteriously altering the chemical, metallurgical and/or mechanical properties of article adjacent to the bond.

Figure 1A:
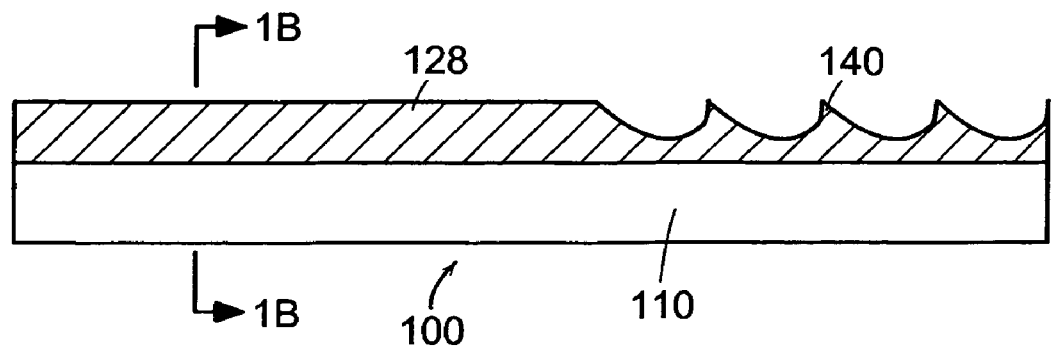
FIG. 1A is a side view.
Figure 1B:
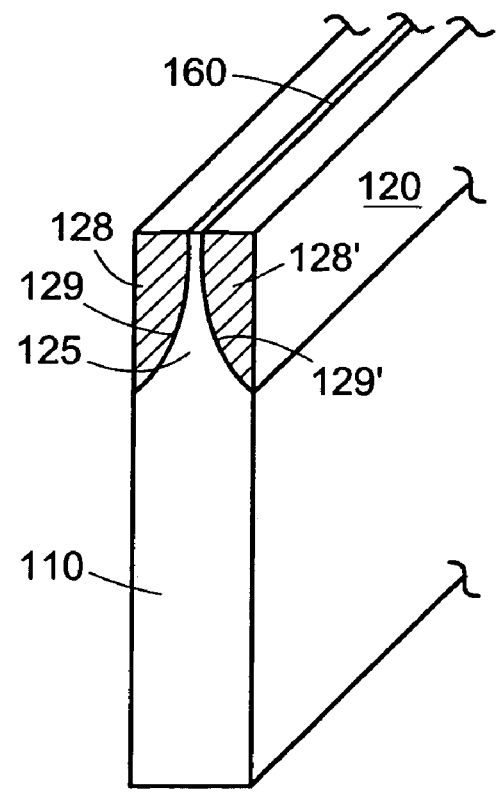
FIG. 1B is a perspective, cross-sectional view across section 1B-1B'.
Figure 1C:
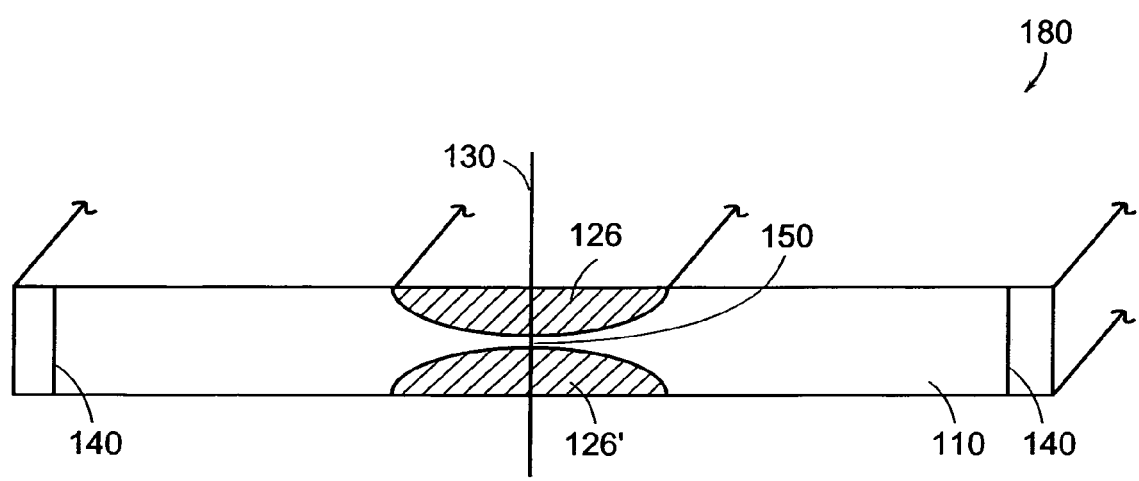
FIG. 1C is a cross-sectional view before slitting, illustrating the features of a composite article according to one or more embodiments of the invention.

In one or more embodiments, a metal edge member is bonded on both sides of a metal base along one side of the body of the base. An exemplary composite metal article according to one or more embodiments of the invention is shown in FIGS. 1A and 1B. The article 100 includes a base 110 having a tapered edge 125 comprised of a first metal and an edge member 128 located adjacent to the tapered edge 125 of the base 110. FIG. 1A also shows an example of a finished product, e.g., a saw blade, having cutting teeth 140 in the edge member 128 of the composite article. As shown in the perspective view in FIG. 1B, the metal base 110 includes a tapered section 125 that is in contact with edge members 128, 128' on opposing surfaces 129, 129' of the thinned, tapered section 125. Edge members are tapered complementary to the taper of section 125, so that the article surface is flat. The taper may be linear or curved, or a more complex geometry resulting from material flow during fabrication. The edge members 128, 128' and the thinned, tapered section 125 of the base 110 form a strong, i.e., metallurgical, bond at the opposing surfaces. As is shown in FIG. 1C, the composite article is prepared from an intermediate composite sheet 180 including two opposing elongated metal elements 126, 126' embedded in and bonded to the metal base 110. The elongated metal elements 126, 126' are trench-like strips that run the length of the composite sheet 180. The composite sheet is slit along line 130 in FIG. 1C to obtain the article shown in FIG. 1B. The composite sheet optionally is also slit along selvage lines 140 to provide a straight even edge to the final article.

Due to the highly effective metallurgical bonding of the two dissimilar materials at the atomic level, the interface is very clean with a discreet bond interface; however, there is no embrittled alloys formed in the bonding zone, as is typical of electron beam welded articles. The thickness of the thinned section 125 can vary according to the contemplated uses of the article of the invention, and can range from about 70% to an insignificant amount of the total thickness, as measured at the exposed surface 160 of the slit article or as measured at the narrowest point 150 between opposing elements (or adjacent to the metal element in those embodiments having only one elongated metal element). In one or more embodiments, the base metal thickness at point 150 or 160 can range to about 30%, or is about 5-15% of the total thickness. The edge members 128, 128' (or the elongated metal elements 126, 126') may have substantially equal thickness on either side of the tapered base section, however, it is recognized that manufacturing process may cause the edge members 128, 128' (or the elongated metal elements 126, 126') to vary somewhat in thickness. In one or more embodiments, the edge members 128, 128' (or the elongated metal elements 126, 126') may be of unequal shape, size and thickness. Improved cutting properties have been observed in blades prepared from the composite metal article of the invention.

Figure 2A:
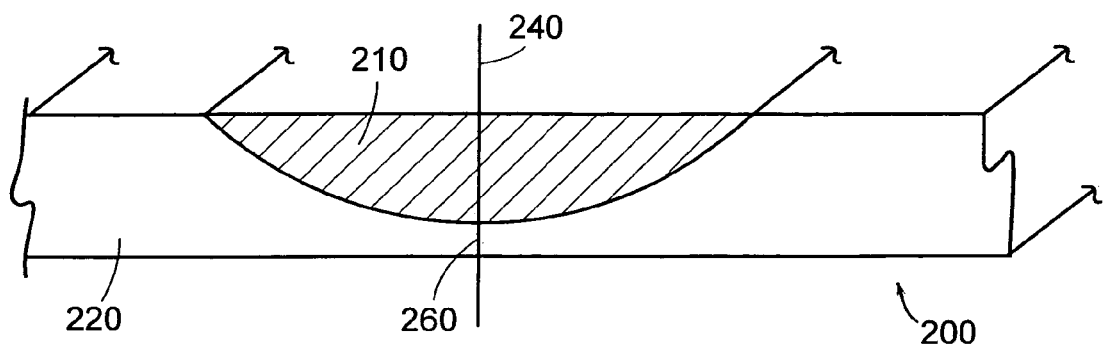
FIG. 2 is a cross-sectional view before slitting (2A), after slitting (2B), and after sharpening to a knife edge of a composite article (2C) according to one or more embodiments of the invention.
Figure 2B:
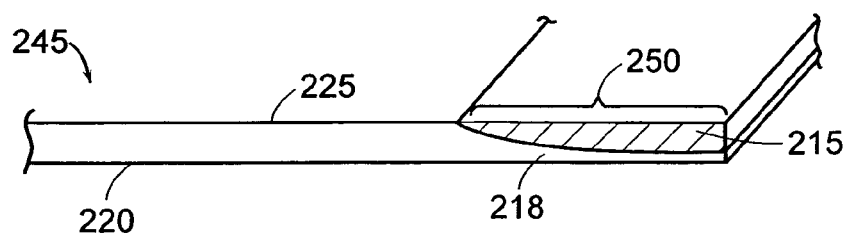
Figure 2C:

In one or more embodiments, a composite metal sheet 200 includes an elongated metal element 210 embedded in and bonded to one side of a metal base 220, as is shown in FIG. 2A. The composite metal sheet 200 is slit at line 240 of FIG. 2A to give a composite article 245 that is illustrated in FIG. 2B. The composite article 245 includes an edge member 215 bonded to a thinned, tapered section 218 of the base 220 along the length of one side of the base. The taper of the tapered section 218 is complementary to the edge member 215 so that the surface 225 of the article 245 is flat. As in FIG. 1A above, cutting teeth may be cut into a cutting edge 250 of the article. Alternatively, the edge may be sharpened to form a knife edge 270, as is shown in FIG. 2C. Such edges are used in band saws and/or in the manufacture of knives. The thickness of the thinned, tapered section 218 or 260 can range from about 1 to 70%, or about 1 to 30% of the total thickness of the article. The tapered region 218 or 260 of the metal base can be exceedingly thin at its narrowest point, to the extent that it is not readily observable (with the naked eye) or detectable only under magnification.

In one or more embodiments of the present invention, the first metal is tougher, e.g., has a higher hardness, than the second metal. In one or more embodiments, the base is a metal having desirable properties of mechanical and thermal stability, for example, under the conditions typically encountered in sawing or cutting operations. In general, the metal base can be any hot or cold rolled metal or metal alloy that is tough and spring-like. The metal base exhibits flexibility, and metals that exhibit flexibility, e.g., spring metals, can be used in the present invention.

In one or more embodiments of the invention, the second metal used as the cutting edge is harder or more wear-resistant than the first metal In one or more embodiments, the edge member is a wear-resistant metal; for example, the edge member is made from a metal capable of withstanding the abrasive conditions typically encountered by the cutting edge under sawing or cutting operations. The edge member metal can be one or more high speed steels, including powdered metals. By way of example only, high speed steels include Matrix II, M2, M42, M51, M3 Type 1, M3 Type 2, and the like.

A feature of the present invention is that the article is not limited to any specific metal or metal alloy for use in either the metal base or the edge metal. Because bonding relies on the diffusion of metal across a dramatically increasing interface, almost any combination of metals can be used in the practice of the present invention. This versatility is in distinct contrast to conventional welding operations used in the fabrication of cutting tools, which often require specific alloy compositions for successful welding.

Figure 4:
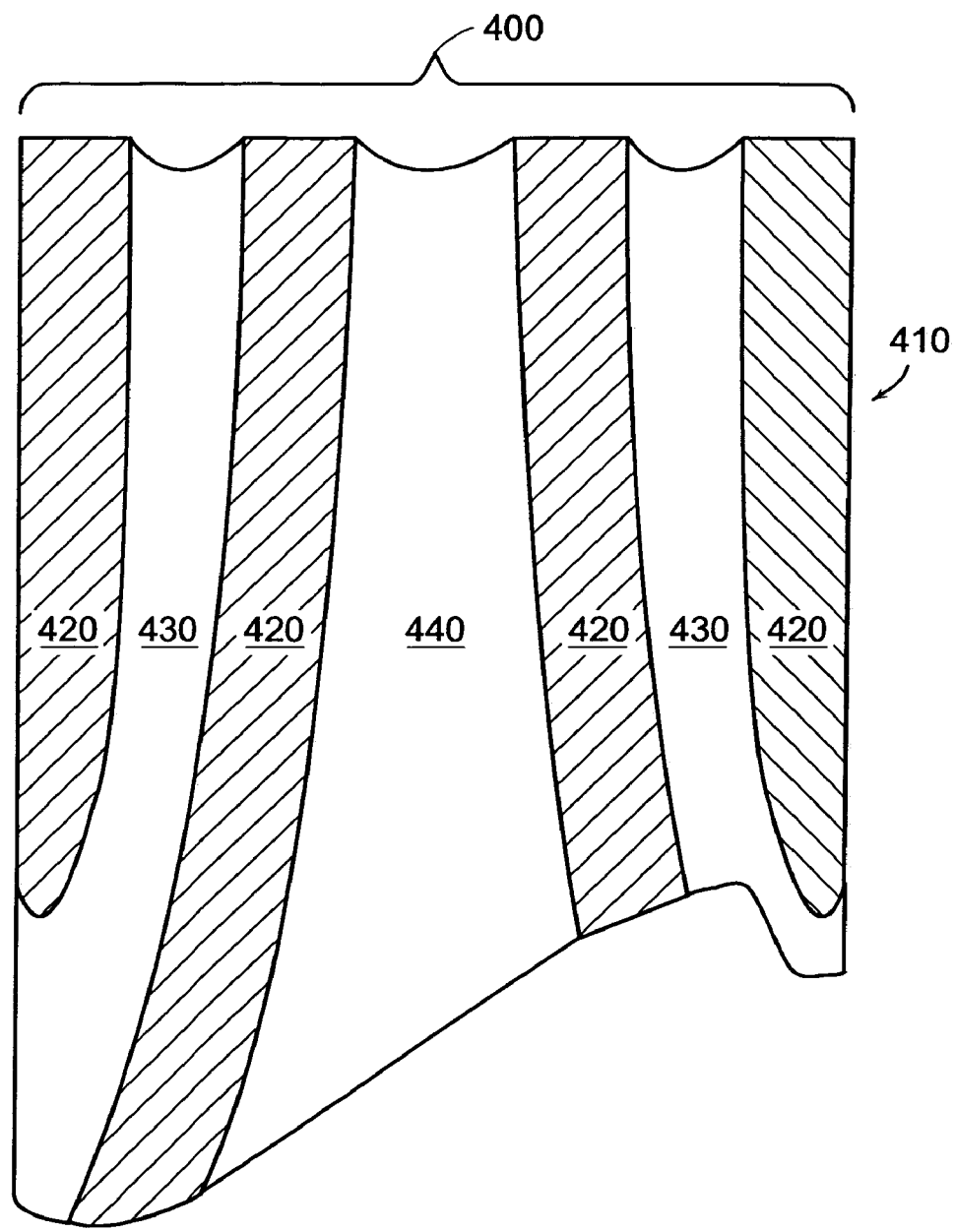
FIG. 4 is a cross-sectional illustration of one or more embodiments of the composite metal article of the invention in which the edge member has a plurality of alternating layers of hard cutting tool metal and a more flexible, supporting metal.

More complex articles are contemplated in accordance with the present invention. In one or more embodiments of the invention, a cutting edge 400 of a composite metal article 410 as shown in FIG. 4 includes a plurality of alternating layers of hard cutting tool metal 420 and a more flexible, supporting metal 430. The innermost section 440 represents the thinned, tapered section of the metal base. The metal used for the flexible, supporting metal sections 430 can be the same as or different from the metal of the metal base 440. The metal components of the cutting edge are metallurgically bonded at shared surfaces. The thickness of the flexible, supporting metal sections 430 can be the same as or different from the thickness of the innermost section 440. For example, FIG. 4 illustrates a composite metal article having three sections 430, 440, 430' of flexible, supporting metal of varying thicknesses. The number, thickness and location of the different metal regions in the edge member are selected to provide a desired property in the article.

Figure 3A:
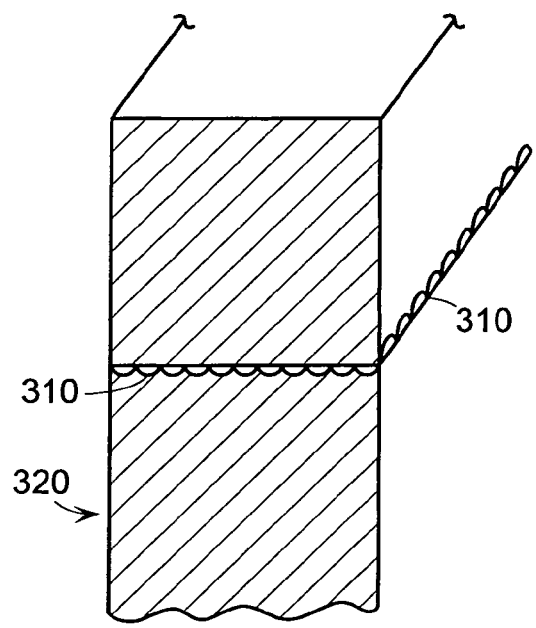
FIG. 3A is a cross-sectional view of a conventional welded article and 3B is a cross-sectional view of a bonded article according to one or more embodiments of the present invention showing the shear line of the bond.
Figure 3B:
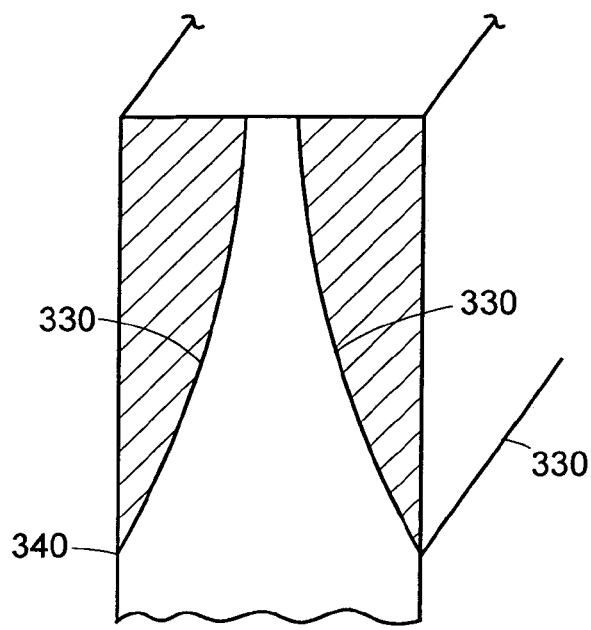

The base and edge members of the composite article form a metallurgical bond using the method of the present invention as described herein below. The bond results from the atomic interaction and rearrangement at the interface of the two metals at moderate temperatures, i.e., below the temperature of any metallurgical transformation ($T_m$) of either metal. Unlike more conventional joining methods, such as electron beam welding or laser welding techniques, there is no significant area near the joint that is materially affected, i.e., weakened, by the joining process. The strength of the bond also arises from the differences in the shear line between a welded article and the bonded article of the present invention. A shear line 310 in conventionally welded article 320 is shown in FIG. 3; and the shear lines 330 of the composite article 340 according to one or more embodiments of the present invention are shown in FIG. 3B. The length (and related area) of the shear line is much larger for the inventive article shown in FIG. 3B than for the conventional article of FIG. 3A. Thus, even if the bond strengths were identical, the composite article of the present invention would be more durable, long lasting and more resistant to shear failure.

The resultant metallurgical bond strength varies according to the materials and methods used in its manufacture; however, the bond is at least strong enough to survive subsequent post-bonding fabrication steps. In the case of saw blade fabrication, the resultant metallurgical bond strength between the base metal and the edge metal is strong enough to withstand slitting, cutting and tooth setting, which are typical post-bonding fabrication steps. After fabrication, the resultant article is typically subjected to a heat treatment to harden the article.

The composite metal article of the invention is useful in the fabrication of cutting tools, i.e., blades. Any variation of a cutting tool is contemplated according to the present invention. A cutting edge of any geometry can be machined into the edge member of the composite article. In one or more embodiments of the present invention, the blade is a toothed blade, e.g., a saw blade such as hand and powered hacksaw, hole saw, jigsaw, reciprocating saw and band saw blades. In one or more embodiments, the blade is a toothless blade, e.g., a knife. By way of example only, a blade can be welded, e.g., butt-welded, to form a band saw blade, or the surface can be machined cut to form a smooth, toothless saw edge or a knife edge Cutting teeth are machined into the cutting edge using conventional processes. The teeth can be of any geometry and orientation suitable for a particular cutting application. The cutting teeth can be arranged in any way desired along the cutting surface. The teeth can be in or out of plane from the base, as is needed by a particular cutting application. In short, one is free to design the cutting tool as is most appropriate for a particular cutting application.

In one or more embodiments of the present invention, the cutting teeth are formed from a combination of a hard cutting tool metal and a softer, supporting metal. The cutting edge presented to a surface to be cut includes alternating regions of hard cutting tool metal and softer metal. In one or more embodiments of the invention, the cutting edge is provided in the form of a composite metal. The cutting edge includes alternating regions or sections of hard and soft metal that have been solid state bonded to each other and include the edge members and tapered regions of the composite metal article shown in FIGS. 1, 2 and 4.

Figure 5:
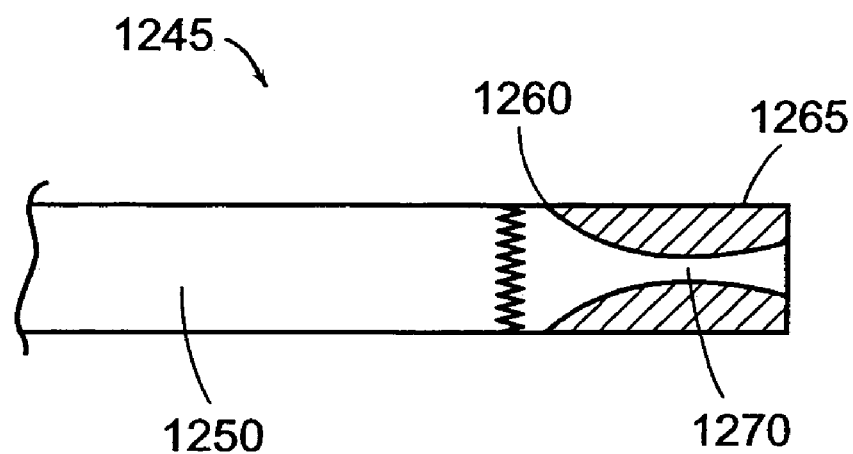
FIG. 5 illustrate a cutting tool according to one or more embodiments of the present invention.

In one or more embodiments, the cutting tool is a hybrid article including a composite metal cutting strip that is prepared in a separate step and that is welded, after fabrication, to a metal base. FIG. 5 shows a hybrid saw blade 1245 using a conventional base 1250. A composite metal cutting edge 1260 includes a solid state bonded composite of alternating layers of hard cutting tool steel 1265 and softer supporting metal 1270. The composite metal cutting edge is formed into a strip, which is then welded to the base using conventional welding techniques. Cutting teeth are then cut into the composite metal cutting edge so that the alternating layers of cutting tool steel and soft metal provides the cutting edges of the present invention The composite metal article of the present invention is prepared by heating an assembly of dissimilar metal components under pressure to form a bonded article, a process known as solid phase bonding. The composite assembly includes a metal base, such as a sheet or strip, having at least one depression or groove positioned longitudinally on one or both sides of the metal base that is capable of receiving an elongated metal element. The term "wire" or "insert wire" may be used as an alternative for "elongated metal element" without loss of any scope afforded the latter term. The wire can be of any shape, and is selected based upon any number of factors, including raw material availability, ease of manufacture, and the desire to complement the shape of the longitudinal depression of the metal base. An exemplary composite assembly 500 including a metal base 510 and elongated elements 520, 525 positioned in depressions 530, 535, respectively, of the metal base 510 is shown in cross-section in FIG. 6A. It is contemplated that the wire insert can project above the plane of the metal sheet. In one or more embodiments, the metal base 510 is made from a first metal that is different from the metal used as the wire inserts 520, 525. Insert wires 520, 525 need not be made from the same metal. The components are cleaned using conventional detergents and scrubbing techniques prior to assembly.

The grooves and related elongated elements can be of any shape or geometry. In one or more embodiments, the elongate element is a rod, bar, wire. The elongated element or wire can have any cross-sectional geometry; for example, a cross-section that is round, oval, polygonal, square, rectangular or rhomboid, and the like, is contemplated. The elongated element can be used in the size and shape provided by the manufacturer. Alternatively, the wire can be processed to a particular size and shape by any conventional method, including by not limited to, drawing, turks head, or wire extrusion. The wire may be reduced from an initial dimension by warm or hot rolling (below $T_m$).

The elongated elements may be, but are not required to be, complementary to the groove in the metal base. A large amount of variability is possible in forming wire inserts-metal base combinations, so long as the shape of the depression is adapted to receive the wire insert. In one or more embodiments, the combination is selected to "lock" the wire into the groove of the metal base. This is typically accomplished by establishing at least two points of contact between the wire insert and the groove. Thus, by way of example only, a round wire in a v-groove or a trapezoidal wire in a round groove provides sufficient contact. In one or more embodiments of the present invention, the wire insert and the groove can be of complementary shapes so that elongated element matches the shape of the groove or depression of the metal base.

The composite assembly is then heated under pressure to bring the metal base and the elongated elements into intimate contact and to form a metallurgical bond between the component metals. In one or more embodiments, the composite assembly is first heated to a temperature that is above room temperature and below the temperature of any metallurgical transformation ($T_m$) of any of the metals of the composite assembly and then passed through a pair of rolls (a "mill roll") to exert bonding pressure and to reduce the article thickness.

Although the actual temperatures used will vary depending upon the materials and pressing procedure used, temperatures can range from about 800 to about 1600° F., or in some embodiments from about 1000 to about 1550° F.

Heating can be accomplished using any conventional method. By way of example, the composite assembly is heated using inductive or electrical resistance heating. In one or more embodiments, the heat is supplied by a form of radiation, for example, laser radiation.

Similarly, the actual pressures used in the practice of the method of the invention will vary greatly depending upon the materials and pressing procedure used. The pressure can be generated using any conventional method. By way of example, pressure is generated using a rolling mill or a turks head. Pressure is a function of many variables including, but not limited to, roll diameter, material deformation resistance (hardness), metal thickness, and the coefficient of friction between the roll and the metal being rolled, and the forces generated in rolling are well known in the industry. In one or more embodiments of the present invention, rolling occurs without lubrication of the rolls, which increases the rolling pressure. In one or more embodiments, the addition of a hard insert wire, and in particular the addition of two wires stacked one on top of the other above and below the metal base, causes higher pressure at the point of contact—the specific location where high pressures are desired to improve bonding. The additional thickness locally due to the presence of the elongated element provides additional pressure for improved bonding during the solid phase bonding operation.

Figure 7A:
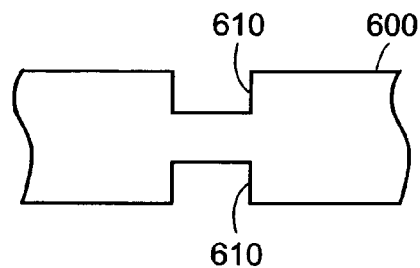
FIG. 7A-7D are cross-sectional illustrations of various embodiments of the metal base and depressions used in one or more embodiments of the present invention.
Figure 7B:
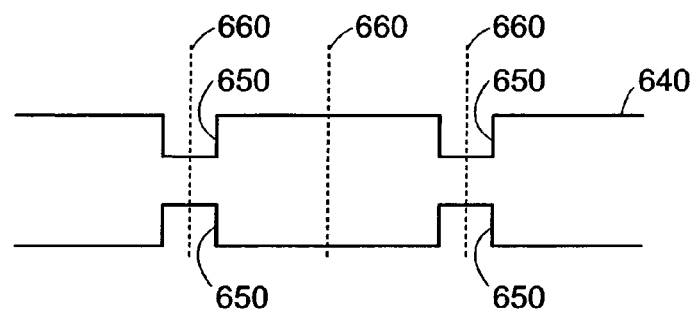
Figure 7C:
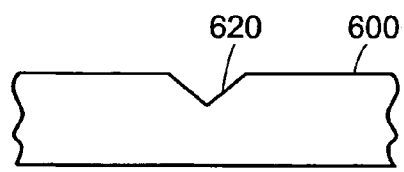
Figure 7D:
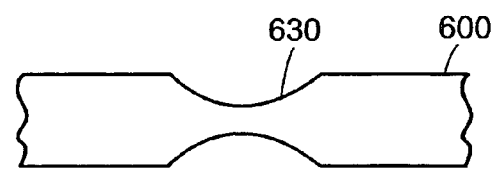

The metal base has one or more grooves or depressions longitudinally-positioned on one or both sides of the metal base. FIG. 7 shows exemplary embodiments of the metal sheet. FIG. 7A is a cross-sectional view of a metal base 600 having a depression 610 on the top and bottom surfaces that is shown, by way of example, as a rectangular groove. This metal base is referred to as a "two-up" sheet, as slitting the base through the center of the groove will result in two product articles. FIGS. 7C and 7D are shown with grooves having other profiles, for example, a triangular 620 profile or rounded 630 profile. Note for example that FIG. 7C has a groove in only one side of the metal base. This configuration is used when a single elongated element is bonded, such as is discussed with reference to FIG. 2. In one or more embodiments, a metal sheet 640 includes two or more depressions 650, as is shown in FIG. 7B. Each depression is capable of receiving an elongated element, such as a wire, and the metal sheet 640 can be divided into several composite articles after bonding by appropriate slitting of the bonded article through the center of the groove and the area between the grooves as indicated by the dashed lines 660 in FIG. 7B. In one more embodiments, the rolled article can be a 1-up, 2-up, 4-up, 6-up, 8-up sheet and the like. While there is no limit to the number and the width of articles that can be obtained using the method of the present invention, the wider the material to be rolled, the more challenging the process.

Figure 6A:
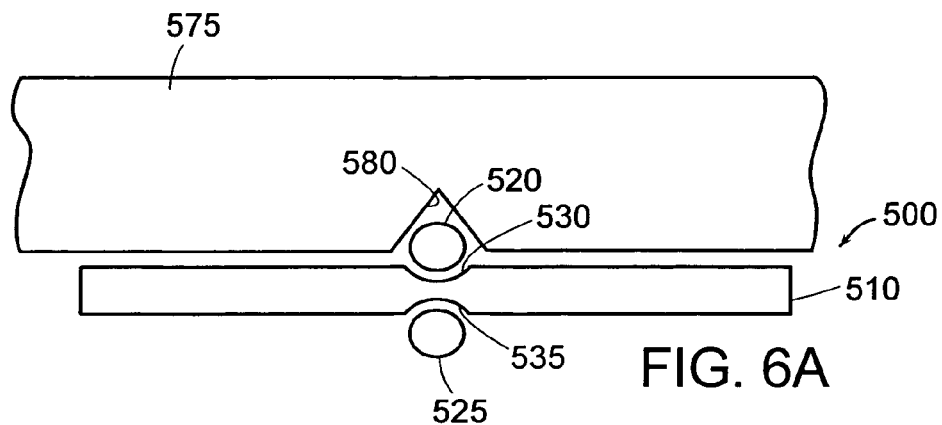
FIG. 6 is an illustration of the assembled composite of two dissimilar metals according to one or more embodiments of the invention (A) prior to bonding; (B) after at least one consolidation step (arrows indicate applied pressure); and (C) after additional consolidation steps, and (D) an enlargement of the bonding region.
Figure 6B:
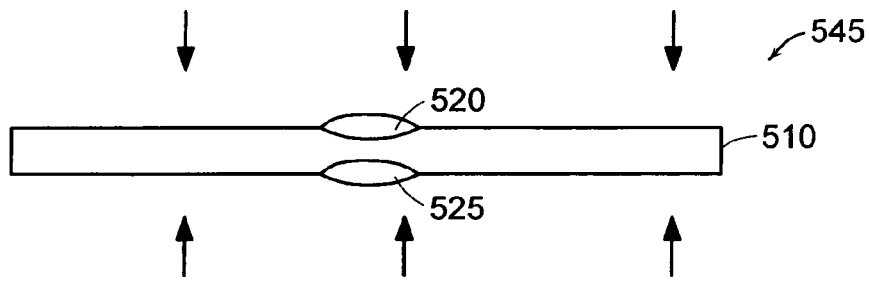

FIG. 6B is an illustration of the article 545 at an intermediate point during the heating and rolling process. The insert wires 520, 525 are pressed against and into the metal base. In one or more embodiments, the metal base is also being reduced in thickness. The greater the thickness reduction of the metal base (expressed as % reduction), the greater the forces experienced at the interface between the metal components. Thus, the wire size and shape and metal sheet thickness and groove size and shape relate to the bonding forces experienced by the composite assembly, and at the point where the insert wire(s) is introduced into the base groove, the large reduction forces favor stronger solid state bonding.

Figure 6C:
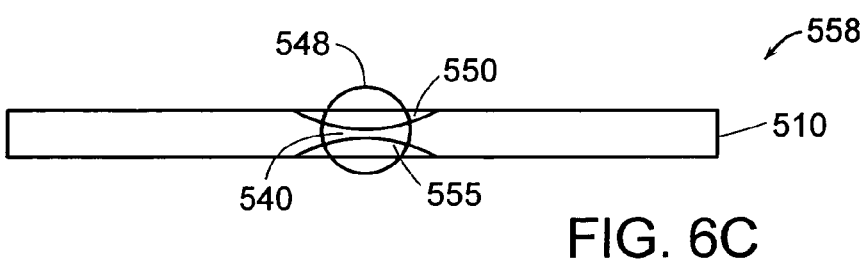
Figure 6D:
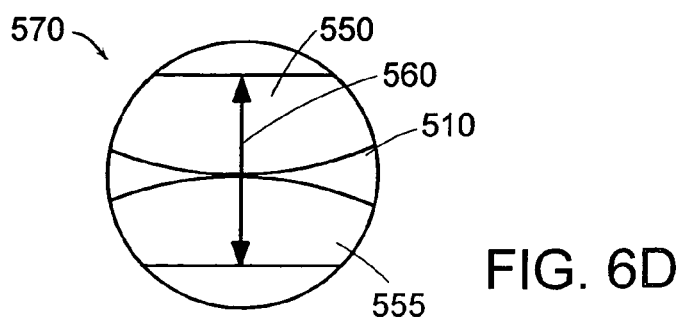

FIG. 6C illustrates a final bonded article 558, in which the pressure has forced the second metal of the wire insert into the metal base and the article surface is substantially flat. The contact area between the wire and the base has increased considerably during the bonding process due to thickness reduction and article elongation. Increased contact area provides a large bonding interface and contributes to the high quality of the bond. The metal base 510 has thinned considerably in a bonding area 548 so that only a thin strip 540 of the metal base is found between the upper and lower regions 550, 555 arising from the former insert wires. In one or more embodiments, the area can be sufficiently thinned such that only a small amount of the metal base remains and essentially the entire cross-section 560 is comprised of the second metal from the insert wires, as shown in the enlarged bonding region 570 in FIG. 6D.

Thus, in a few simple (and rapid) steps, the method of one or more embodiments of the invention provides a bonded article of a desired thickness. The starting materials can be thicker than those used in conventional electron beam welding processes, yet final thickness is achieved in fewer steps and less time, resulting in a significant savings in cost and materials.

In one or more embodiments using insert wire above and below the metal base, it is desired to keep the wires registered in place. In instances where the wire can move laterally, the resultant bonded sections of the wire insert can shift during rolling so that the resultant bonded regions are offset from one another. Use of a wire insert and groove geometry that forms a multipoint contact is helpful in reducing lateral shift of the bonded second metal region.

In one or more embodiments of the present invention, the arrangement and geometry of the wire, metal base and rolls are selected to reduce the relative movement of the wire and base. If the wire shifts during processing, the resultant bonded metal element may be out of position for subsequent processing, e.g., slitting. In particular for the case where a wire pair are positioned above and below the metal base, it is desired to maintain accurate position of the components of the composite assembly. In one or more embodiments, the upper and lower depressions are kept in close alignment to the desired position.

In one or more embodiments of the present invention, the roll, metal base, or both, includes a groove that engages the wire insert to constrain the lateral movement of the insert wire. As is shown in FIG. 6A, roll 575 has a groove 580 that accepts the insert wire and holds it in position with respect to the roll. A lower roll (not shown) with a similar notch engages the lower insert wire in those embodiments that include one.

Figure 8A:
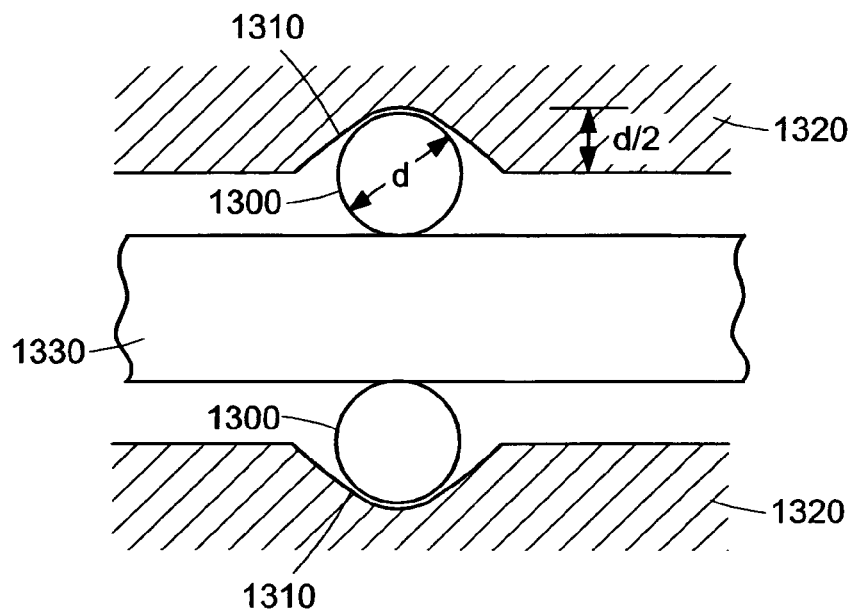
FIG. 8A-8C is an illustration of the assembled composite of two dissimilar metals according to one or more embodiments of the invention (A) prior to bonding; (B) after at least one consolidation step; and (C) after additional consolidation steps.
Figure 8B:
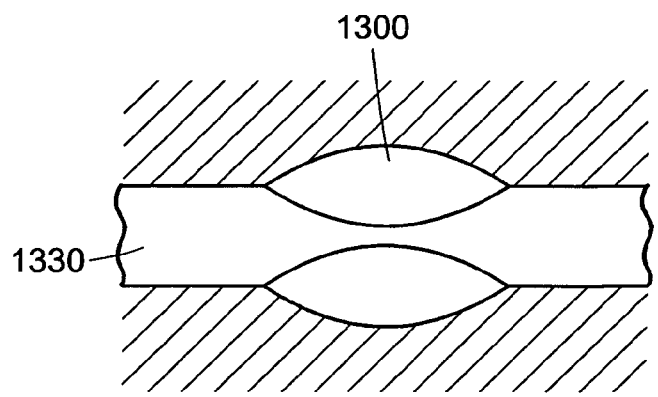
Figure 8C:
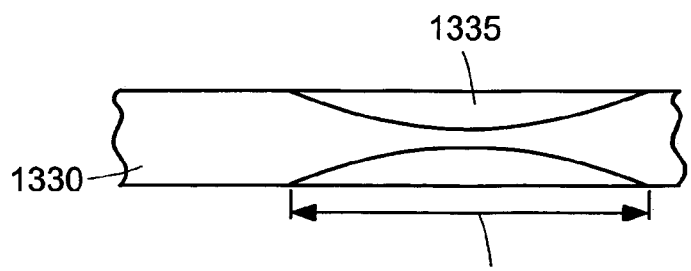

In one or more embodiments, the wire 1300 is engaged in a groove 1310 of a roll 1320 that runs in the rolling direction. When there is a deep groove in the rolls (shown in FIG. 8A by way of example as ½d, where d is the wire diameter), no depression in a metal base 1330 is required to fix the wire position. A first rolling pass shown in FIG. 8B fixes the location of the wire by embedding the wire into the metal base and, once fixed, a subsequent pass (FIG. 8C) drives the fixed wire down into the metal base, widening the wire into an embedded metal strip 1335 and narrowing the thickness of the metal base at the bonding region 1340 in the process.

Figure 9:
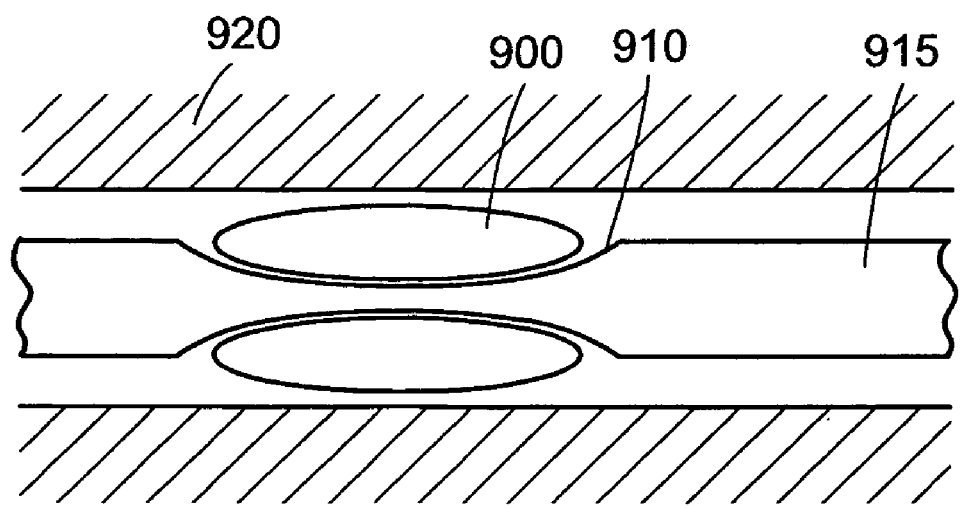
FIG. 9 illustrates composite assembly according to one or more embodiments of the present invention.

In one or more embodiments, the wire is engaged in the depression of the metal base and no roll groove is employed to fix the component positions. As shown in FIG. 9, when the wire 900 is flat so that it nests deeply in depression 910 of the metal base 915, lateral movement is sufficiently constrained so that the roll 920 is not required to be grooved in order to fix the relative positions of the wire and metal base.

The composite metal article of the invention can be further processed to obtain the desired article. For example, in the manufacture of saw blades, the composite article is divided into two similar pieces by slitting the article through the center region 548 or center region 570 of the article. See FIG. 6. In one or more embodiments, the upper and lower bonded metal elements are substantially symmetric and are stacked above and below each other so that the composite metal article can be divided at about the center point of the bonding region to provide two substantially identical pieces. The slit piece from an article having a thinned first metal center such as region 548 has an edge with the structure shown in FIG. 1C.

Figure 10A:
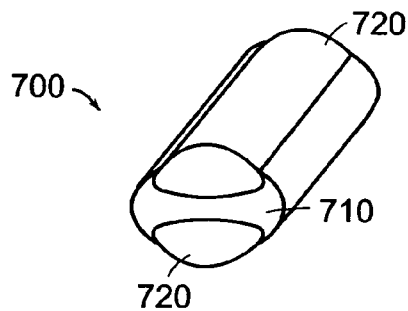
FIG. 10A through 10D illustrate the preparation and use of a composite metal, wire according to one or more embodiments of the present invention.

In one or more embodiments, the elongated metal element used as an insert wire also is a composite metal. FIG. 10A is a perspective drawing of a composite elongated metal element (wire) 700 of the present invention. The element 700 includes a metal 710, for example one that is similar to or the same as the first metal used for the metal sheet 755, and a dissimilar metal 720. In one or more embodiment, metal 720 is harder than metal 710. The component metals are arranged in alternating regions and the metal regions are bonded at their interfaces. In one or more embodiments, the harder metal 720 is located at an outer surface so that the harder metal provides increased wear resistance to the composite.

Figure 10B:
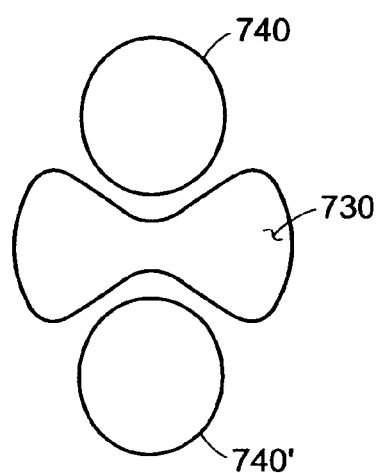
Figure 10C:
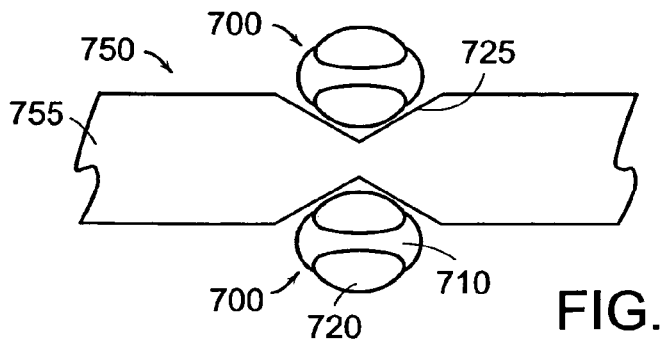

FIG. 10C illustrates a composite assembly 750 using the composite metal element 700 and a metal base 755. It is desired that the composite wire is aligned in a plane of the metal base and remains so aligned during consolidation and bonding. Proper alignment includes positioning the composite wire in the metal base so that the alternating layers of metals 710 and 720 are substantially parallel with the plane of the metal base. In one or more embodiments, the composite wire nests or fits snugly into a groove 725 of the metal base 755 and/or into a groove of the bonding roll (not shown). In one or more embodiments, the composite wire is of a shape, e.g., trapezoidal and the like, that discourages rotation of the composite wire within the groove. In one or more embodiments, the bonding rolls and/or the metal base includes a v-groove. In one or more embodiments, neither the depression of the metal base nor the composite wire is round. The heated components are assembled and pressed to form the bonded article.

Figure 10D:
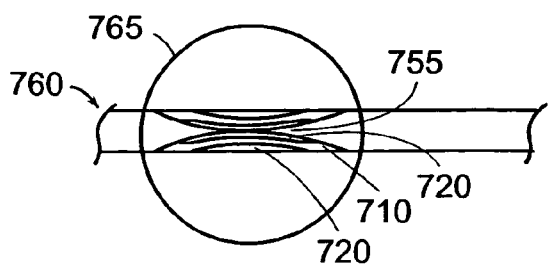

FIG. 10D illustrates the final composite metal article 560 after the heat and pressure treatment of the present invention. The bonded region 765 includes alternating layers of metals 710 and 720 disposed in a bonding region 765 of the metal base. The thus-obtained composite sheet is slit vertically through the central section of the bonding region 765 to reveal an edge of alternate layers of hard metal sections (720) and flexible supporting metal (710, 755). An exemplary resultant article is shown in FIG. 4.

FIG. 10B illustrates a method of assembly of the composite wire. A conventional steel bar 730 is preshaped in a form, here a barbell, that can accommodate round (or some other shape), wear resistant steel wire 740, 740'. The bar includes depressions above and below, which can be introduced by drawing turks head rolling or conventional v-groove rolling of a conventional bar or round wire. The three components are cleaned using conventional detergents and scrubbing techniques, bonded and rolled to a final consolidated dimension. Bonding of the wire can be accomplished using a hot rolling process or according to the method of the present invention or any other technique that serves to metallurgically bond the wire components. Alternatively, the assembly can be processed in a turks head process using a turks head having an inverted groove roll that provides adequate pressure to bond the composite wire.

The final bonded articles can have varying thicknesses, for example, ranging from about 0.020" to about 0.100". Articles having small final thicknesses and/or relatively large percent reduction (e.g., large increases in the area of interface) tend to form very strong bonds. In instances where the final thickness is relatively large, e.g., 0.065" or greater, or where the percent reduction in thickness is not very large, the bonding strength is not as high. In other instances where the overall article is very wide, one may not want to use rolling to attain the entire width as flow properties can vary over the greater distances. In these (and other) instances, a composite cutting edge can be welded to an edge of the metal base using conventional welding techniques to provide the cutting edge of the present invention. An example of such an article has been previously described (FIG. 5).

Figure 11A:
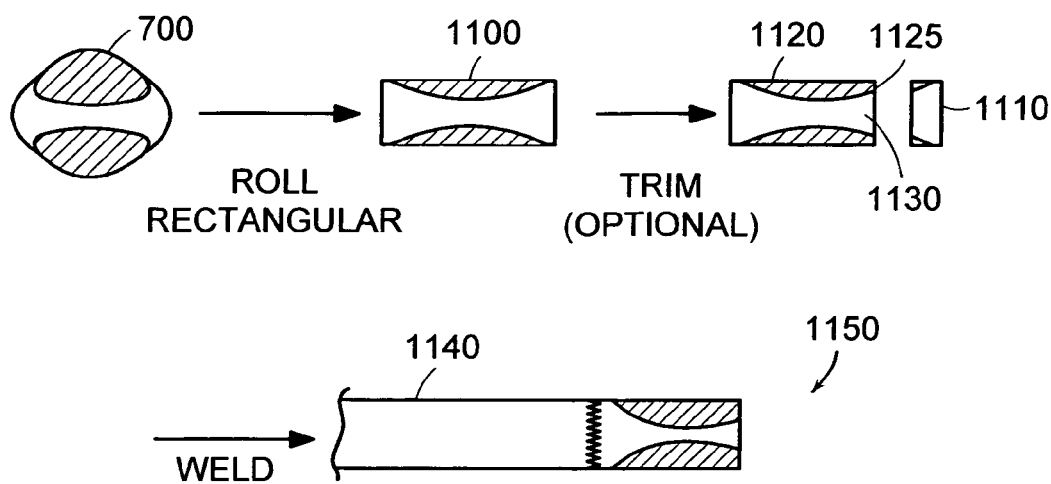
FIG. 11A is an illustration of one embodiment of the present invention in which the bonding region in the metal base is offset from center, and 11B is a method of making a composite article in which the edge members are offset from center according to one or more embodiments of the invention.

A method of making a welded product having a composite metal edge is now described with reference to FIG. 11A. A composite metal wire 700 is prepared as described above with reference to FIG. 10. The consolidated wire is bonded using heat and pressure and rolled to rectangular cross section 1100, for example, by turks head rolling or by alternating steps of vertical rolling and horizontal rolling. Selvage edge 1110 optionally is cut from rectangular form 1100 to expose a surface 1125 having alternating regions of hard metal 1120 and softer metal 1130 metals. The cut rectangular form 1100 is welded to a base 1140 at the side opposite the exposed surface to form a welded composite metal article 1150. The metal of the base and the soft metal of the composite edge are the same or similar metals.

Figure 11B:
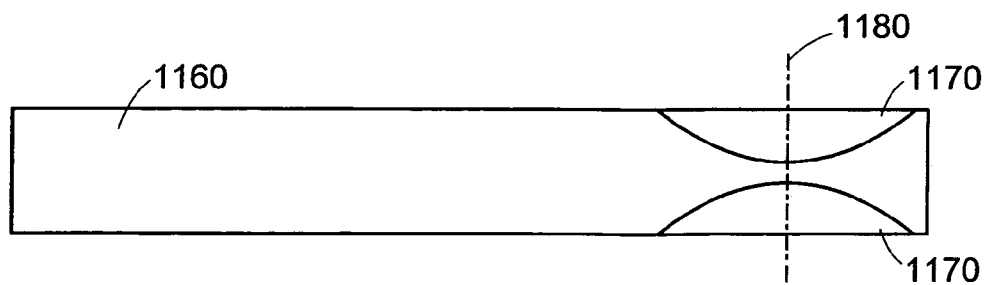

Similarly, the article can be of any width, and can for example range from less than ¼" to 3½" or more. FIG. 11B illustrates a method and article using offset bonding, e.g., bonding at a location off set from center and near the edge of the article. In those instances where a large blade 1160, e.g., a 3½" blade is desired, it may not be convenient to bond a "2 up" article. In such cases, the longitudinal depression 1170 can be offset to one side of the metal base and a single width article ("1 up" article) is rolled. The edge is cut off at the selvage line 1180 to reveal the composite cutting edge, with the balance being selvage, as is shown in FIG. 11B.

In one or more operations, solid phase bonding of the dissimilar metals is accomplished using bonding rolls and/or turks head rolls for the application of heat and/or pressure. In one or more embodiments, bond rolling is carried out using a plurality of bonding rolls or "stands." A stand is a component of a mill used for the bonding operation. Each stand includes a pair of bonding rolls that is independently motor driven and independent "screw down" gear assembly used to adjust the vertical position of the rolls for the application and release of pressure at the rolls and control of material thickness. A mill includes a plurality of independent rolling stands operating in tandem and in communication with one another through "bridges" or enclosures that span between the exit of one stand and the entrance of the next stand in order to keep the materials being bonded in a controlled, typically reducing, atmosphere. In one or more embodiments, the mill includes two or more rolling stands, and can include 3 to 6 stands, or more.

Many modifications and variations of the process are within the scope of the invention. It is appreciated that a pressing operation such as rolling will either elongate or widen the composite article. In the present invention, there is an additional cause for lateral spread due to the presence of additional material (the elongated elements) which are being forced into the center of the metal sheet directly over one another. Left unattended, the lateral spread causes the center of the rolled form to fracture. In one or more embodiments, the bonding cavity, i.e., the space between the bonding rolls, have the ability to restrain lateral spread. "Restraining lateral spread" as that term is used herein, means that the lateral spread is substantially reduced or eliminated (it is recognized that a small amount of lateral spread will occur despite steps taken to prevent it), or that the material is allowed to spread laterally to a predetermined width, at which point the material is constrained from further spreading. The materials being reduced in the bonding cavity are allowed to spread forward and to the rear along the axis of the metal sheet or strip. In addition to providing a product of uniform dimensions, constraining lateral spread has been found to maintain bonding pressures of the article to enhance the quality of the bond.

Figure 12A:
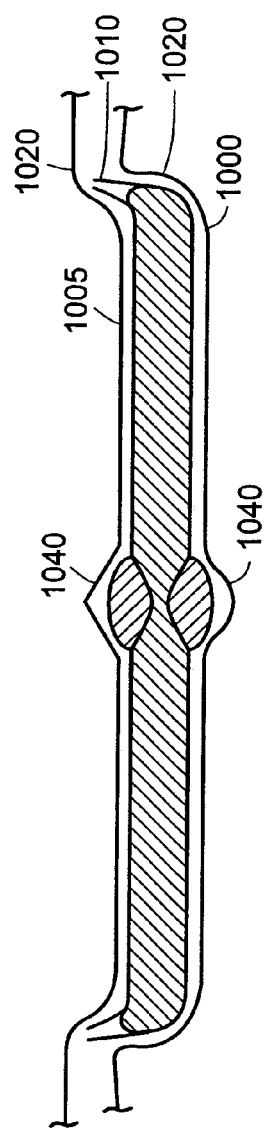
FIG. 12 illustrates an embodiment of the present invention for constraining lateral spread of the composite article using matched male/female rolls.
Figure 12B:
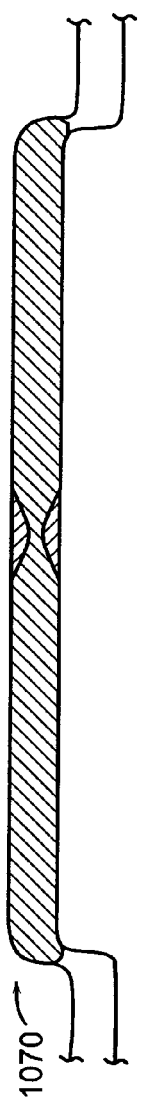
Figure 12C:
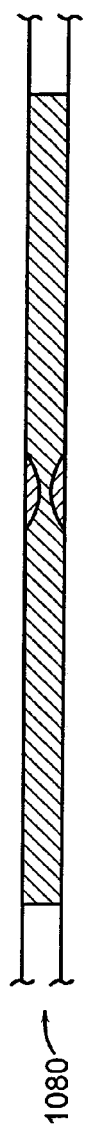

In one or more embodiments, lateral spread is restrained in a rolling operation by employing a male 1000/female 1005 bonding roll arrangement such as that shown in FIG. 12A, and having a clearance area 1010 at the edges of the rolls. Under rolling pressure, the metal base material attempts to flow up into the large clearance area 1010. The spaces at the edges of the roll are designed to permit the rolled base metal to flow (deform plastically) partly up into the space provided. This upward flow is limited by friction and flow ceases. In at least one or more embodiments, the edges 1020 of the rolls are curved to facilitate material flow. The clearance area can be angled, so that the further the metal flows into the area, the narrower the metal path becomes and the greater the friction restraining it. In one or more embodiments, the rolls further include a notch 1040 on the roll surface for receiving a portion of the composite assembly and reducing the lateral movement of the assembled components in the roll during the rolling operation. The notch assists in maintaining the bonded elongated elements (derived from the insert wires) registered in place, either as a specified location along the roll and/or stacked over one another. In one or more embodiments, a second rolling stand 1070 reverses the direction of clearance area, as shown in FIG. 12B. In operation, the composite assembly is rolled under heat and pressure at a first male/female rolling stand, where the elongated element is engaged in the metal sheet groove and lateral flow is restrained. The composite assembly is rolled to a thinner dimension at a second stand for which the direction of the clearance area is reversed and the second metal is further embedded and flattened into the metal sheet. Subsequent rolls do not require a male/female roll arrangement as the spread no longer threatens to split the thin web of material and all subsequent rolls 1080 are flat (with a small crown as is conventional to accommodate over-rolling the edges).

In one or more embodiments, lateral spread is restrained using an edge roll system, e.g., a turks head. A "turks head" is a special configuration of a rolling mill, i.e., it is two mills set up to roll in the same plane. A rolling mill becomes a turks head when an additional roll pair is used whose rolling axis is positioned at 90° relative to the mill rolls rolling axis. The turks head rolling axis is coplanar with the plane of reduction. As the material passes through a bonding roll and material is spread laterally to the sides of the roll, the turks head rolls apply an opposing force to material at its edges. A turks head is employed in the initial rolling stages, for example, in the first two mill stands where significant lateral flow can otherwise cause the base metal to split at the groove. While all mill stands reduce the base (web) thickness to about the same degree, a large percentage of thickness reduction occurs at or around the insert wire in the initial stages when the wire is embedded into the metal base.

Figure 13A:
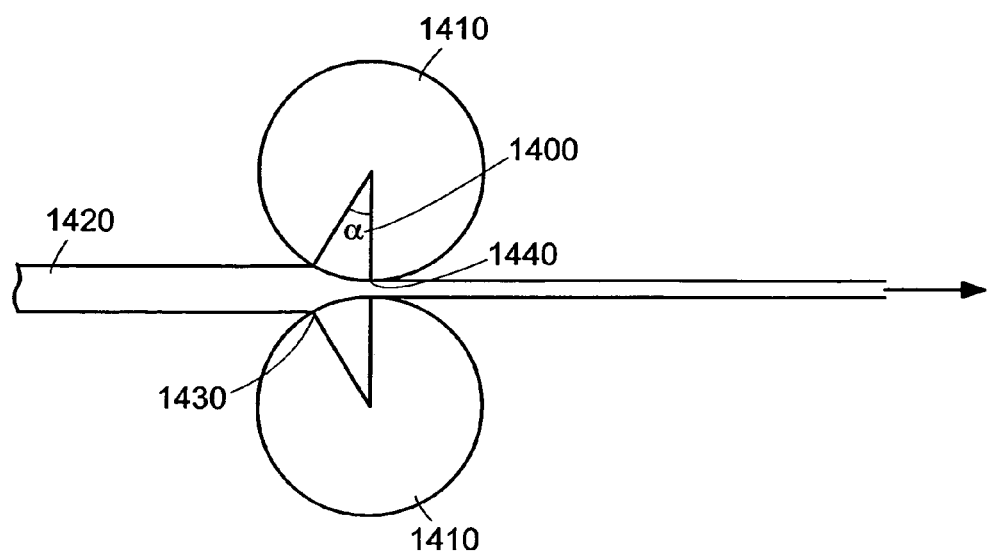
FIG. 13 illustrates another embodiment of the present invention for constraining lateral spread of the composite article using an offset turks head.
Figure 13B:
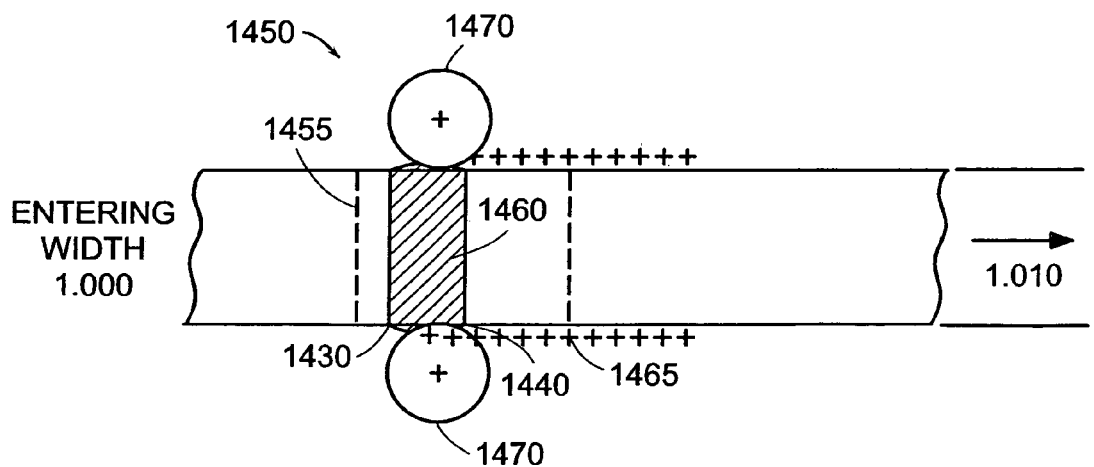

For the purposes of this invention, it is desirable that the side rolls do not produce a "flash" (a thin bead of metal that flows between the mill rolls and turks head rolls). The present invention has discovered that flashing can be avoided by locating the side rolls slightly ahead (upstream) of the rolling axis of the mill rolls. In one or more embodiments, the offset of the turks head roll is within the arc of contact of the bonding roll with the material to be rolled. The arc of contact 1400, as shown in FIG. 13A in elevation view, is the angle through which the bonding roll 1410 rotates from the point of initial contact 1430 of the roll with the material 1420 to the narrowest point of contact 1440 (at the nip). As soon as the material contacts the bonding roll, the material experiences forces of increasingly greater magnitude, and significant lateral spread can occur prior to the material passing through the nip. Thus, positioning the turks head slightly ahead of the nip prevents the lateral flow of the material. FIG. 13B is a plan view of the offset turks head roll 1450 of the present invention. The top mill roll is omitted for clarity, but dashed lines 1455 indicate its location. The hatched area 1460 is the contact area of the material and the mill rolls during the arc of contact. The broken line 1465 denoted with "+" indicates the typical increase in width observed for an unrestrained material. Note that the material begins to widen shortly after contact with the roll and well before the nip. To counteract this lateral flow, side rolls 1470 are positioned upstream from the rolling axis of the mill rolls (which coincides with the location of the nip 1440). The side rolls provide an additional rolling force that opposes and constrains the lateral flow of the material. Note that the mill rolls are the same width as the target width in order for the side rolls to be able to effectively constrain lateral flow.

In one or more embodiments of the present invention, the offset is in the range of about ¼" to about ¾". As in the case using male/female roll assemblies, the turks head roll is not necessary once the thickness of the material is reduced by 2 or 3 passes. In one or more embodiments, the turks head roll is used in the first, second and optionally, third stands.

In one or more embodiments, a turks head is employed to limit the lateral spread to a predetermined value. In one or more embodiments, the turks head can be allowed to spread or can be located a distance from the edge of the mill roll. When the material enters the mill roll, the material will spread a predetermined amount up to the point where it meets the turks head. In one or more embodiments, the metal base is narrower than the mill roll width, and the turks head is positioned at the edge of the mill roll (or may be located a distance from the edge of the mill roll). Again, the material is able to spread laterally, but only to a point at which it contacts the turks head roll. Controlled lateral spread can result in the controlled thinning of the base, particularly in the bonding region where the insert wires and metal base are in contact. Controlled lateral spread can be used to thin the metal base in the bonding region to the point that is breaks or thins to a point that the base metal is effectively absent.

An exemplary process for the manufacture of a composite metal article according to one or more embodiments is described.

The insert wire 1500 is shaped to the desired dimension and cross-section, for example by cold or hot working. The shaped wire is cleaned using standard metals cleaning procedures to remove residual oils and oxides. Wires can be butt-welded into long lengths to increase run times. In an exemplary process a 0.095" round wire, e.g., M2, is rolled to 0.080" by 0.105" rhomboid shape.

The metal base (6150) 1510 is initially obtained as 0.065-0.250" thick and of a width necessary to provide the final desired width and is turks head rolled to form a v-shaped (inverse groove) depression on either side without changing the thickness and with very little change in the width. The turks head pull through technique is able to keep top and bottom grooves in alignment within 0.002" and in the center of the strip within +/−0.005" and also maintained the base thickness (although the base may widen slightly).

Figure 14:
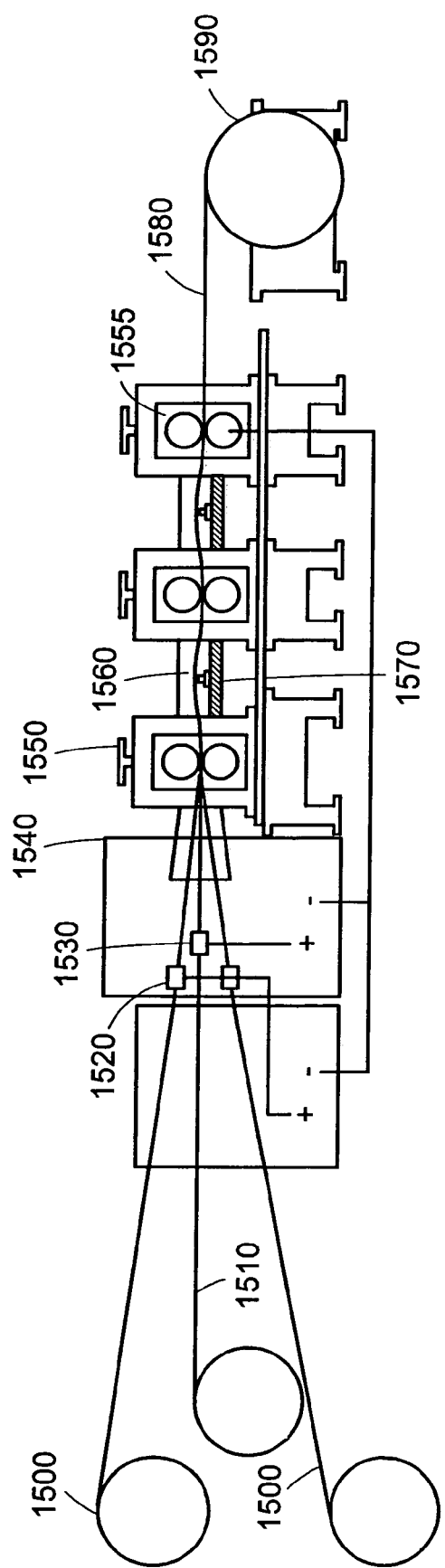
FIG. 14 illustrates a multi-stand mill for fabrication of the composite articles of the present invention.

The materials (insert wire 1500 and metal base 1510) are fed off rolls and heated as they approach the mill stands using direct current heating. With reference to FIG. 14, edge wire(s) and metal base strip are paid off into (or through) a high potential contact of a DC rectifier, e.g., 1520, 1530, respectively, for heating to operating temperature (ca. 1250° F.), and then are fed into an entrance retort 1540 containing an oxide reducing atmosphere, such as hydrogen. Oxidation/ reduction cleaning is a known process in which the material is heated in air to form a thin oxide layer and then passed into an $H_2$ containing retort for reduction. Any organic residues or $H_2O$ remaining after scrubbing is also removed. The edge wire is positioned above and below the base metal strip as the components approach the first mill 1550. FIG. 14 illustrates a three-stand mill; however, composite metal article has also been successfully prepared using a six-stand mill. The number of mill stands used depends, in part, on the percent reduction to be taken at each stand and the total final thickness.

The mill stands include rolling mills that are surrounded by a gas chamber 1555 that keeps the material in a reducing atmosphere, although they can be exposed to air for brief periods. A bridge retort 1560 spans between mill stands and maintains a reducing atmosphere for the heated strip as it passes from mill to mill. Exposure to atmosphere at these elevated temperatures would otherwise result in surface oxidation. The mill rolls are made from durable hard materials, such as high speed steed, e.g., H13, or tungsten carbide. The mill rolls are selected to minimize sticking of the rolled materials. The mill rolls are typically hollow; and they can be air- or water-cooled. For example, they are shell mill-type rolls that are supported on an arbor capable of being water-cooled.

Each mill rectifier operates on its own circuit so that it may be independently controlled. The temperature drop of the material as it exits one mill stand and enters a subsequent one is monitored and the rectifiers adjust heating (e.g. voltage) to compensate for temperature drop. A hybrid heating system using resistance and induction heating is also possible. In a hybrid system, the first mill stand is set up as a conventional bonding configuration with ground contact at the first stand. Re-heating the materials between successive hot rolling stands is accomplished with high frequency induction units. As the wire/base metal assembly enters the first mill stand at target temperature, mill load is increased to target mill load. A load cell at each stand monitors mill load. As each mill stand equilibrates to the target temperature and mill load, the subsequent mill rolls are engaged.

Typically the first mill stand roll speed is operator-controlled and subsequent roll speeds are set as a function of its predecessor's speed. As material is reduced in gauge, the percent reduction is proportional to the speed differential of the rolls. The web tension of the material between mill stands can be monitored using a tensiometer 1570 and mill speeds can be adjusted as needed to control web tension; however, many other conventional methods of monitoring speed and thickness may be used. Tension control is accomplished using a roll over which the hot strip passes at a shallow angle. An arrangement transmits the force to a load cell. The load cell feeds back to a controller, which monitors the tension and makes mill speed adjustments accordingly.

The bonded article exits the mill stands as a continuous bonded strip 1580 that is taken up at spool 1590. Slitting is done in a separate operation.

Although various embodiments that incorporate the teachings of the present invention have been shown and described in detail herein, those skilled in the art can readily devise many other varied embodiments that incorporate these teachings. All references mentioned herein are incorporated by reference.

What is claimed is:

1. A method of making a composite cutting tool having two dissimilar metals, comprising:
    (a) providing a metal base comprised of a first metal and having first and second opposing surfaces, said base having at least one longitudinal depression in at least one of said first and second opposing surfaces;
    (b) introducing a wire comprised of a second metal into said at least one depression of the metal base to form a composite assembly, said second metal comprising a cutting tool grade steel and being harder than the first metal;
    (c) heating the composite assembly under pressure to urge the adjacent surfaces of the wire and the at least one depression together to form a bonded article and to reduce the thickness of the metal base at least at the wire/base interface;
    (d) constraining a lateral spread of the composite assembly using a turks head during at least a portion of the step of heating under pressure under conditions to maintain a lateral bonding pressure on the composite assembly; and
    (e) forming the bonded article into a cutting tool having a cutting edge comprising cutting tool grade steel.

2. The method of claim 1, wherein the step of providing a metal base in step (a) comprises providing a sheet or strip.

3. The method of claim 2, wherein the step of providing a sheet or strip comprises providing a sheet having an aspect ratio of greater than 5:1.

4. The method of claim 1, wherein the step of providing a metal base in step (a) comprises providing a metal base having at least one depression on each of said first and second surfaces.

5. The method of claim 1, wherein the step of providing a metal base in step (a) comprises providing a metal base having two or more depressions on at least one of said first and second opposing surfaces.

6. The method of claim 1 or 5, wherein the step of providing a metal base having at least one longitudinal depression in step (a) comprises providing at least one depression located in the center of the first opposing surface of the metal base.

7. The method of claim 1, 4 or 5, wherein the step of providing a metal base having at least one longitudinal depression in step (a) comprises providing at least one depression offset from the center of the first opposing surface of the metal base.

8. The method of claim 4, wherein the step of providing a metal base having at least one longitudinal depression in step (a) comprises providing the depression of the first opposing surface and the depression of the second opposing surface opposite one another.

9. The method of claim 1, 4 or 5, wherein applying pressure in step (c) is accomplished by rolling or swaging.

10. The method of claim 9, wherein applying pressure is accomplished by rolling.

11. The method of claim 1 or 4, wherein the providing step comprises providing the at least one depression in the form selected from the group consisting of v-groove, square groove, rounded groove, and rectangular groove.

12. The method of claim 1 or 4, wherein the providing step comprises providing the wire having a cross-sectional shape selected from the group consisting of round, square, oval, polygonal, rectangular, and rhomboid.

13. The method of claim 12, comprising providing the at least one depression of the metal base of step (a) in a shape that is complementary to the shape of the wire of step (b).

14. The method of claim 1, wherein the step of heating the composite assembly under pressure in step (c) comprises reducing the thickness of the metal base to the extent that a transverse cross-section of at least a portion of the bonded article includes substantially no first metal.

15. The method of claim 1, wherein the step of heating the composite assembly under pressure in step (c) comprises reducing the thickness of the metal base to 1 to 70% of a transverse cross-section of the article at the metal base's thinnest point.

16. The method of claim 1, wherein side rolls of the turks head are forward offset at a distance from a set of bonding rolls at an entrance side of said bonding rolls, so that the side rolls of the turks head apply an opposing force to the composite assembly to constrain lateral spread of the composite assembly.

17. The method of claim 16, wherein the constraining step comprises providing the offset distance in the range of about 0.25" to about 0.75".

18. The method of claim 16, wherein the constraining step comprises providing the offset distance that is located within an arc of contact of the composite assembly with the bonding roll.

19. The method of claim 10, wherein said rolling comprises a plurality of rolling steps.

20. The method of claim 19, wherein said rolling comprises 2-10 rolling steps.

21. The method of claim 19, wherein said rolling comprises 3-6 rolling steps.

22. The method of claim 19, wherein at least a first rolling step consolidates the composite assembly and constrains lateral spread.

23. The method of claim 22, wherein at least one subsequent rolling step reduces the thickness of the composite assembly.

24. The method of claim 19 wherein the bond strength between the wire and the metal base increases during the plurality of rolling steps.

25. The method of claim 19, wherein the step of constraining lateral spread comprises constraining lateral spread in a first rolling step.

26. The method of claim 25, wherein the step of constraining lateral spread further comprises constraining lateral spread in a second rolling step.

27. A method of making a composite cutting tool having two dissimilar metals, comprising:
(a) providing a metal base comprised of a first metal and having first and second opposing surfaces;
(b) positioning at least one wire comprised of a second metal at a location on at least one of said first and second surfaces, wherein the second metal comprises a cutting tool grade steel and is harder than the first metal;
(c) restricting the lateral movement of the wire relative to its location on said surface to form a composite assembly;
(d) heating the composite assembly under pressure to urge the adjacent surfaces of the at least one wire and the metal base together to form a bonded article and to reduce the thickness of the metal base at the base/wire interface, wherein at least a first rolling step using a turks head consolidates the composite assembly and maintains a lateral bonding pressure on the composite assembly; and
(e) forming the bonded article into a cutting tool having a cutting edge comprising cutting tool grade steel.

28. The method of claim 27, wherein the step (c) of restricting the lateral movement of the wire relative to its position on the metal base comprises providing at least one longitudinally-positioned depression in at least one of said first and second surfaces for receiving said wire.

29. The method of claim 27, wherein at least one subsequent rolling step reduces the thickness of the composite assembly.

30. The method of claim 27, wherein the step of heating the composite assembly under pressure in step (d) comprises thinning the metal base to the extent that a transverse cross-section of at least a portion of the bonded article includes substantially no first metal.

31. The method of claim 1 or 27, wherein the step of providing comprises providing the first metal selected from the group consisting of hot or cold rolled metal or metal alloys that are spring-like.

32. The method of claim 1 or 27, wherein the step of introducing comprises providing the at least one wire comprised of the second metal selected from the group consisting of high speed steels.

33. The method of claim 1 or 27, comprises forming a metallurgical bond between the first and second metals.

34. The method of claim 1 or 27, comprising reducing the thickness of the metal base across substantially the entire base.

35. The method of claim 1, wherein the heating step and the constraining step provide a predetermined thickness of the metal base at the wire/base interface.

36. The method of claim 1, wherein the heating step and the constraining step comprise heating the composite assembly under pressure and laterally constraining the composite assembly to laterally increase the wire/base interface.

37. The method of claim 1, wherein the step of forming a bonded article comprises machining cutting teeth into the cutting edge.

38. The method of claim 1, wherein the step of forming a bonded article comprises forming the cutting edge into a knife edge.

39. The method of claim 1, wherein the step of heating under pressure reduces the thickness of the metal base at its narrowest point to about 1-30% of the total thickness of the article.

40. The method of claim 1, wherein the step of heating under pressure reduces the thickness of the metal base at its narrowest point to about 5-15% of the total thickness of the article.

* * * * *